United States Patent
Desclos (10) Patent No.: US 12,230,442 B2
(45) Date of Patent: Feb. 18, 2025

(54) SURFACE MOUNTABLE ULTRACAPACITOR DEVICE INCLUDING A RESIN LAYER HAVING VENTS

(71) Applicant: Laurent Desclos, San Diego, CA (US)

(72) Inventor: Laurent Desclos, San Diego, CA (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 464 days.

(21) Appl. No.: 17/511,784

(22) Filed: Oct. 27, 2021

(65) Prior Publication Data
US 2022/0130623 A1    Apr. 28, 2022

Related U.S. Application Data

(60) Provisional application No. 63/105,932, filed on Oct. 27, 2020.

(51) Int. Cl.
*H01G 11/82*    (2013.01)
*H01G 11/18*    (2013.01)

(52) U.S. Cl.
CPC ............. *H01G 11/82* (2013.01); *H01G 11/18* (2013.01)

(58) Field of Classification Search
CPC ........ H01G 11/82; H01G 11/18; H01G 11/74; H01G 9/08; Y02E 60/13
See application file for complete search history.

(56) References Cited

U.S. PATENT DOCUMENTS 5,093,762 A * 3/1992 Sato ................ H01G 9/08 29/25.03
7,019,960 B2   3/2006 Okamura et al.
(Continued)

FOREIGN PATENT DOCUMENTS

CN   106158393   11/2016
CN   206040447    3/2017
(Continued)

OTHER PUBLICATIONS

International Search Report and Written Opinion for PCT/US21/56779 dated Feb. 23, 2022, 9 pages.

*Primary Examiner* — Dion R. Ferguson
(74) *Attorney, Agent, or Firm* — Dority & Manning, P.A.

(57) ABSTRACT

A surface mountable ultracapacitor device is disclosed. The device comprises: a package including sidewalls extending in a direction generally perpendicular to a base to define an upper end wherein an interior cavity is defined between an inner surface of the base and the sidewalls; first and second conductive members disposed on the inner surface of the base; first and second external terminations on the outer surface of the base and electrically connected to the first and second conductive members, respectively; an ultracapacitor positioned within the interior cavity and including a housing and an electrode assembly and electrolyte within the housing, the ultracapacitor including first and second leads electrically connected to the first and second conductive members, respectively; a resin provided within the interior cavity and encapsulating at least a portion of the ultracapacitor; and one or more vents extending through the resin and at least to a surface of the resin. The present invention also discloses a printed circuit board including the aforementioned surface mountable ultracapacitor device as well as a communications device including the aforementioned surface mountable ultracapacitor device.

23 Claims, 6 Drawing Sheets

(56) References Cited

U.S. PATENT DOCUMENTS

| | | | |
|---|---|---|---|
| 8,824,122 B2* | 9/2014 | Vilc | H01G 11/48 |
| | | | 29/25.03 |
| 9,508,492 B2* | 11/2016 | Biler | H01G 9/012 |
| 10,242,808 B2 | 3/2019 | Eilerstsen et al. | |
| 2005/0002148 A1* | 1/2005 | Ishijima | H01G 9/012 |
| | | | 361/315 |
| 2011/0164347 A1* | 7/2011 | Aitchison | H01M 50/24 |
| | | | 174/50.54 |
| 2012/0106031 A1* | 5/2012 | Vilc | H01G 9/15 |
| | | | 977/773 |
| 2012/0257327 A1* | 10/2012 | Zednickova | H01G 9/06 |
| | | | 29/25.41 |
| 2012/0274152 A1* | 11/2012 | Kamath | H01G 2/08 |
| | | | 307/109 |
| 2015/0049419 A1* | 2/2015 | Biler | H01G 9/012 |
| | | | 361/536 |
| 2017/0338055 A1* | 11/2017 | Knopsnyder | H01G 11/24 |
| 2018/0144878 A1* | 5/2018 | Ritter | H01G 11/78 |
| 2020/0303137 A1* | 9/2020 | Brambilla | H01G 11/76 |
| 2022/0130623 A1* | 4/2022 | Desclos | H01G 11/18 |

FOREIGN PATENT DOCUMENTS

| | | |
|---|---|---|
| CN | 207353095 | 5/2018 |
| CN | 109216049 | 1/2019 |
| JP | 2006165417 | 6/2006 |
| JP | 2011159849 | 8/2011 |
| JP | 2014157881 | 8/2014 |
| WO | WO2010030073 | 3/2010 |
| WO | WO2013100493 | 7/2013 |
| WO | WO2019070897 | 4/2019 |

* cited by examiner

SURFACE MOUNTABLE ULTRACAPACITOR DEVICE INCLUDING A RESIN LAYER HAVING VENTS

CROSS-REFERENCE TO RELATED APPLICATION

The present application claims filing benefit of U.S. Provisional Patent Application Ser. No. 63/105,932 having a filing date of Oct. 27, 2020, and which is incorporated herein by reference in its entirety.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. Due to the effective surface area of the particles and the small spacing between the electrodes, large capacitance values may be achieved. Nevertheless, problems remain. For instance, gases may be produced during use resulting in an increase in pressure causing the ultracapacitor to explode or rupture. In order to address such issues, many conventional ultracapacitors include a vent valve directly into the housing of the ultracapacitor. However, that may result in the loss of electrolyte and the possibility of contaminants from the outside entering into the ultracapacitor. Regarding another problem, partly because of the nature of the housing, mounting ultracapacitors onto circuit boards can be a timely and costly process. As such, a need currently exists for an improved ultracapacitor.

SUMMARY OF THE INVENTION

In accordance with one embodiment of the present invention, a surface mountable ultracapacitor device is disclosed. The device comprises: a package including sidewalls extending in a direction generally perpendicular to a base to define an upper end wherein an interior cavity is defined between an inner surface of the base and the sidewalls; first and second conductive members disposed on the inner surface of the base; first and second external terminations on the outer surface of the base and electrically connected to the first and second conductive members, respectively; an ultracapacitor positioned within the interior cavity and including a housing and an electrode assembly and electrolyte within the housing, the ultracapacitor including first and second leads electrically connected to the first and second conductive members, respectively; a resin provided within the interior cavity and encapsulating at least a portion of the ultracapacitor; and one or more vents extending through the resin and at least to a surface of the resin In accordance with another embodiment of the present invention, a printed circuit board is disclosed. The printed circuit board includes the aforementioned surface mountable ultracapacitor device, In accordance with another embodiment of the present invention, a communications device is disclosed. The communications device includes the aforementioned surface mountable ultracapacitor device, Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed a surface mountable ultracapacitor device. The device includes a package for housing an ultracapacitor. In addition, the device includes a resin for encapsulating the ultracapacitor as well as one or more vents that extend through the resin to an outer surface of the resin. The present inventors have discovered that various benefits may be realized by providing an ultracapacitor as a surface mountable device as described herein. For instance, when gases are generated surrounding the ultracapacitor or permeate through a seal of the housing of the ultracapacitor, the resin and vents allow for escape of the gases in a relatively safe manner. As a result, issues with the performance and/or structural integrity of the ultracapacitor may be avoided and thus the safety of the ultracapacitor can be greatly improved. In turn, this may also improve the service life and the strength of the ultracapacitor. Furthermore, by providing the ultracapacitor within a package, the ultracapacitor may be mounted onto a circuit board, such as a printed circuit board, in a more efficient and less costly manner. For example, instead of having to electrically and/or physically connect the leads of the ultracapacitor to a circuit board, the terminations present on the package of the device may be electrically and/or physically connected to the circuit board using means generally known in the art.

Various embodiments of the present invention will now be described in more detail.

Surface Mountable Ultracapacitor Device

Figure 3A:
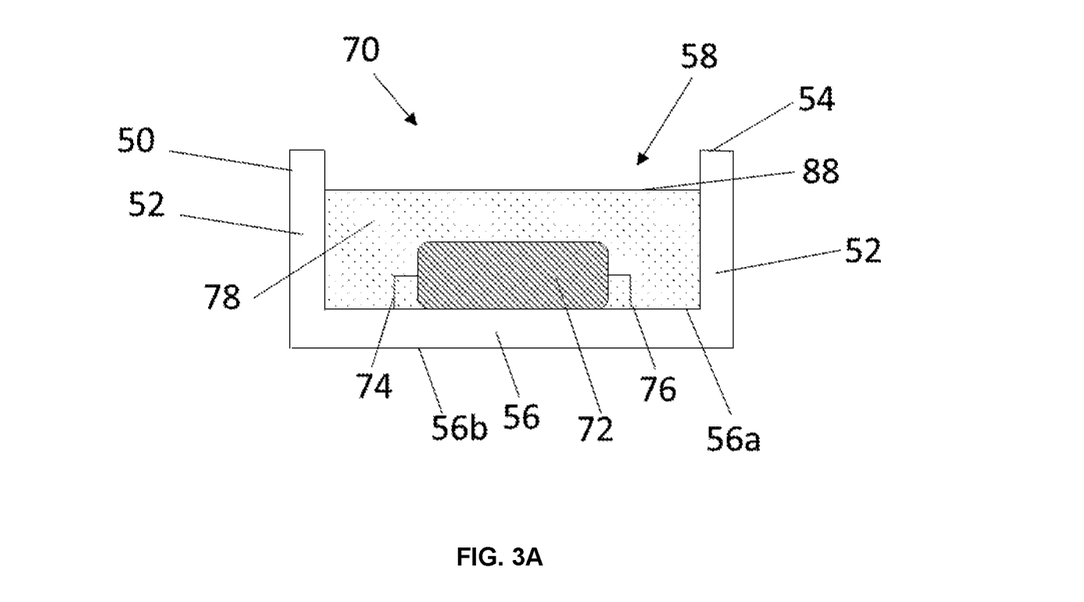
FIGS. 3A-3C illustrate one embodiment of a surface mountable ultracapacitor device according to the present invention.
Figure 3B:
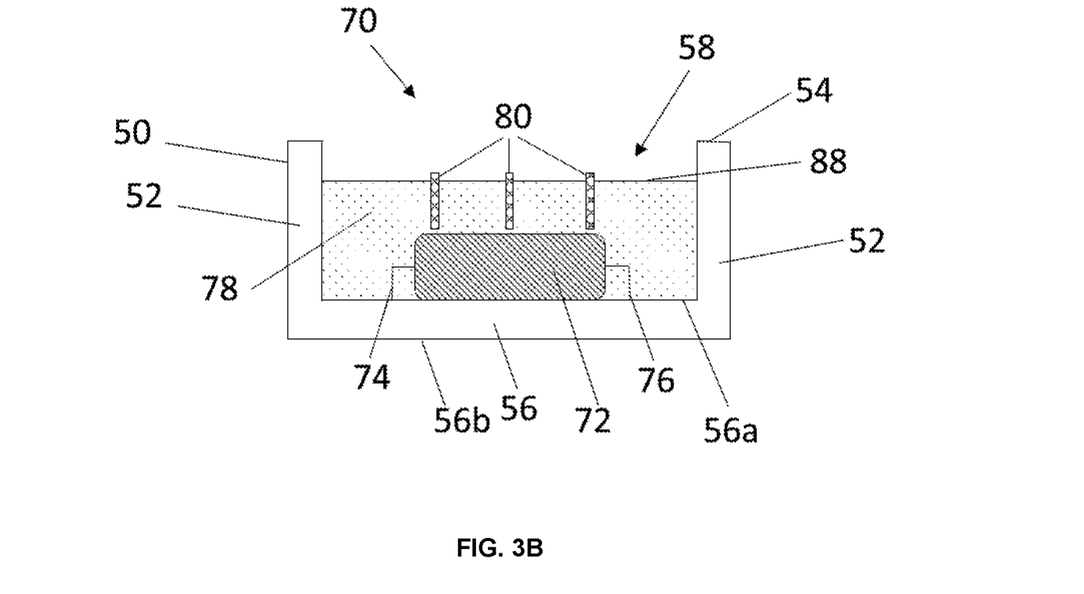
Figure 3C:
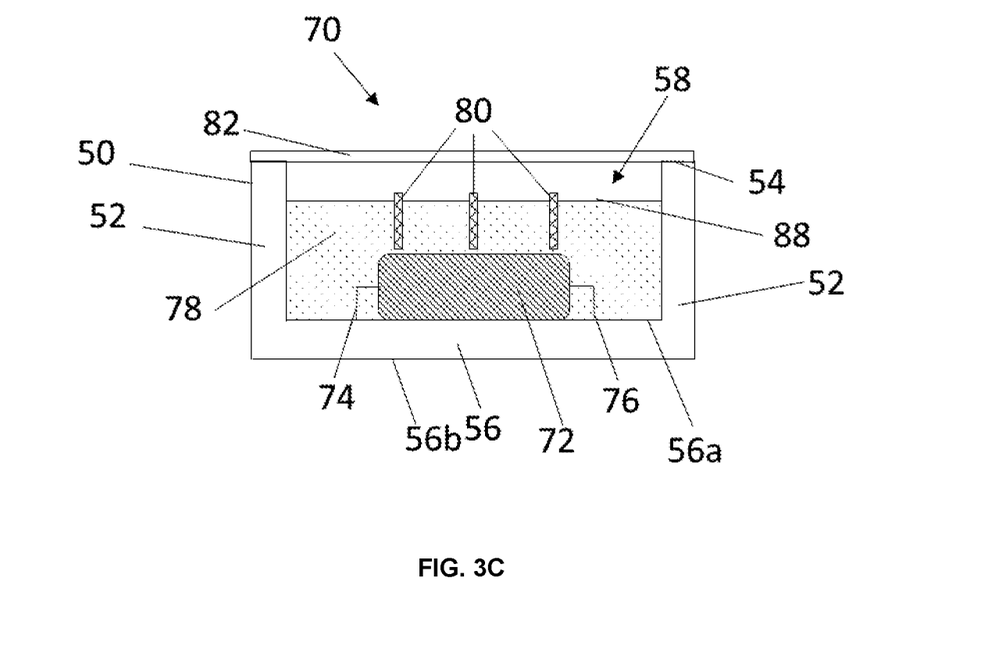
Figure 4:
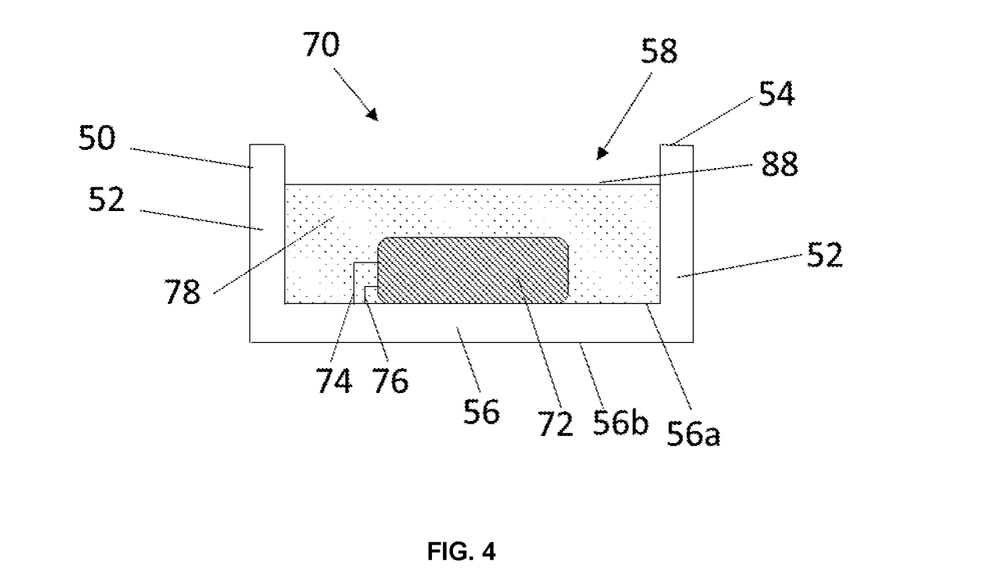
FIG. 4 illustrates another embodiment of a surface mountable ultracapacitor device according to the present invention.

As indicated herein, the present invention is directed a surface mountable ultracapacitor device. Referring to FIGS. 3A-3C, one embodiment of such a device is illustrated. In particular, the device 70 includes a package 50 for housing an ultracapacitor 72 within an interior cavity 58 of the package 50. In particular, the ultracapacitor 72 includes a housing within which an electrode assembly and electrolyte are retained and sealed. The electrode assembly contains a first lead 74 that is electrically connected to a first electrode (not shown) and a second lead 76 that is electrically connected to a second electrode (not shown). The leads 74 and 76 extend outwardly from the electrode assembly and ultracapacitor and are electrically connected to first and second conductive members (not shown), respectively, provided on the package 50. As illustrated in FIG. 3A, the leads 74 and 76 extend from opposing ends of the electrode assembly and ultracapacitor 72. However, as illustrated in FIG. 4, it should be understood that the leads 74 and 76 may extend from the same end of the electrode assembly and ultracapacitor 72. In addition, as illustrated, in one embodiment, the leads remain within the package 50 and do not extend beyond the base 56, sidewalls 52, and lid 82 of the package 50.

Generally speaking, the leads 74 and 76 are attached to first and second conductive members, respectively, provided on the package 50 in a manner such that both the leads and the conductive members are provided in a plane that is generally parallel to the base 56. When attached in this manner, however, portions of the leads may remain extended from the electrode assembly in a manner such that the major surface of the electrode assembly may be generally parallel to the base 56. Of course, it should be understood that this is by no means required. In other embodiments, for example, the leads may be provided on a bottom surface of the electrode assembly so that it may be simply stacked onto the conductive members.

In any event, attachment of the leads 74 and 76 to the conductive members may generally be accomplished using any of a variety of known techniques, such as welding, laser welding, conductive adhesives, etc. In one particular embodiment, for example, the leads 74 and 76 are connected to the conductive members 60 and 62, respectively, with a conductive adhesive. The conductive adhesive may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al.

Once connected in the desired manner, a resin 78 is also provided within the interior cavity 58 of the package 50. The resin 78 may be utilized to encapsulate the ultracapacitor 72. For instance, after mounting the ultracapacitor 72 within the package 50, a certain amount of the surface area of the ultracapacitor 72 may remain exposed to the interior cavity and ambient. In this regard, the resin 78 may be utilized to encapsulate the ultracapacitor and cover at least a certain portion of the ultracapacitor 72. For instance, the resin 78 may be utilized to cover at least 50% or more, such as 60% or more, such as 70% or more, such as 80% or more, such as 90% or more, such as 95% or more, such as 98% or more, such as 99% or more, such as 100% of the exposed area of the ultracapacitor.

In addition, the resin 78 may be provided such that it occupies 30 vol. % or more, such as 40 vol. % or more, such as 50 vol. % or more, such as 60 vol. % or more, such as 70 vol. % or more, such as 80 vol. % or more, such as 90 vol. % or more, such as 95 vol. % or more of the interior cavity of the package. The resin may be provided such that it occupies 100 vol. % or less, such as 99 vol. % or less, such as 98 vol. % or less, such as 95 vol. % or less, such as 90 vol. % or less, such as 85 vol. % or less, such as 80 vol. % or less, such as 75 vol. % or less, such as 70 vol. % or less of the interior cavity of the package. Such percentage, in one embodiment, may be based on the total volume of the interior cavity prior to mounting of the ultracapacitor. In another embodiment, such percentage may be based on the remaining volume of the interior cavity after mounting of the ultracapacitor.

The resin may be formed from generally any resin that can be utilized with ultracapacitors for electronic applications. In this regard, the resin may be one that is stable upon exposure to high temperatures. In this regard, the resin may be a thermoplastic resin, a thermoset resin, or a mixture thereof. In one embodiment, the resin may be a thermoplastic resin. In another embodiment, the resin may be a thermoset resin. The resin may be provided within the interior cavity and surrounding the ultracapacitor using means generally known in the art. For instance, a solution or melt of the resin may be provided within the interior cavity. The solution or melt may then be allowed to solidify or harden to form the resin. For instance, in certain embodiments, cooling may be sufficient for hardening and forming the resin 78 within the package 58. In other embodiments, such hardening may be facilitated by curing. For example, such curing may include thermal curing (e.g., application of heat), radiation curing, or both. Radiation curing may include various techniques generally known in the art such as electron beam radiation, UV radiation, etc. In one embodiment, thermal curing may be required for forming the resin. In another embodiment, radiation curing may be required for forming the resin. In an even further embodiment, thermal curing and radiation curing may be required for forming the resin.

As indicated herein, in one embodiment, the resin may be a thermoset resin. For example, the thermoset resin may include an epoxy resin (e.g., epoxy novolac resin), a polyester (e.g., unsaturated polyester), a vinyl ester, a cyanate ester, a polycyanurate, a phenolic resin (e.g., phenol-formaldehyde), a polyurethane, a melamine resin, a polyimide, etc. including mixtures thereof. Epoxy resins are particularly suitable. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc.

If desired, curing agents may also be employed to promote curing. When employed, the curing agents typically constitute from about 0.1 to about 20 wt. % of the resin. Exemplary curing agents include, for instance, amines, peroxides, anhydrides, phenol compounds, silanes, acid anhydride compounds and combinations thereof. Specific examples of suitable curing agents are dicyandiamide, 1-(2 cyanoethyl) 2-ethyl-4-methylimidazole, 1-benzyl 2-methylimidazole, ethyl cyano propyl imidazole, 2-methylimidazole, 2-phenylimidazole, 2-ethyl-4-methylimidazole, 2-undecylimidazole, 1-cyanoethyl-2-methylimidazole, 2,4-dicyano-6,2-methylimidazolyl-(1)-ethyl-s-triazine, and 2,4-dicyano-6,2-undecylimidazolyl-(1)-ethyl-s-triazine, imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate, etc. Still other useful curing agents include phosphine compounds, such as tributylphosphine, triphenylphosphine, tris (dimethoxyphenyl)phosphine, tris(hydroxypropyl)phosphine, and tris(cyanoethyl)phsphine; phosphonium salts, such as tetraphenylphosphonium-tetraphenylborate, methyltributylphosphonium-tetraphenylborate, and methyltricyanoethylphosphonium tetraphenylborate); amines, such as 2,4,6-tris(dimethylaminomethyl)phenol, benzylmethylamine, tetramethylbutylguanidine, N-methylpiperazine, and 2-dimethylamino-1-pyrroline; ammonium salts, such as triethylammonium tetraphenylborate; diazabicyclo compounds, such as 1,5-diazabicyclo[5,4,0]-7-undecene, 1,5-diazabicyclo[4,3,0]-5-nonene, and 1,4-diazabicyclo[2,2,2]-octane; salts of diazabicyclo compounds such as tetraphenylborate, phenol salt, phenolnovolac salt, and 2-ethylhexanoic acid salt; and so forth.

As indicated herein, in one embodiment, the resin may be a thermoplastic resin. The thermoplastic resin may include a polyester (e.g., polybutylene terephthalate, polyethylene terephthalate, polylactic acid, etc.), a polyolefin, a styrenic polymer, a polyamide, a polyarylene sulfide, a polycarbonate, a polysulfone (e.g., polyarylethersulfones polyethersulfone, etc.), a polyketone, a polyetherketone (e.g., polyaryletherketone, polyetheretherketone, etc.), a polyamide (e.g., nylon-6, nylon-6,6, nylon-6,10, nylon-11, nylon-12, etc.), a polyimide, etc. In this regard, the thermoplastic polymer may generally be a high performance polymer capable of withstanding high temperatures. In this regard, the thermoplastic resin may be selected having a generally high melting temperature. For instance, the thermoplastic resin may have a melting temperature of about 150° C. or more, such as about 200° C. or more, such as about 250° C. or more, such as about 300° C. or more, such as about 350° C. or more to about 500° C. or less, such as about 450° C. or less, such as about 400° C. or less.

The resin may also include other additives. For example, these additives may include photoinitiators, viscosity modifiers, suspension aiding agents, pigments, stress reducing agents, non-conductive fillers, stabilizers, etc. Suitable photoinitiators may include, for instance, benzoin, benzoin methyl ether, benzoin ethyl ether, benzoin n-propyl ether, benzoin isobutyl ether, 2,2 dihydroxy-2-phenylacetophenone, 2,2-dimethoxy-2-phenylacetophenone 2,2-diethoxy-2-phenylacetophenone, 2,2-diethoxyacetophenone, benzophenone, 4,4-bisdialylaminobenzophenone, 4-dimethylaminobenzoic acid, alkyl 4-dimethylaminobenzoate, 2-ethylanthraquinone, xanthone, thioxanthone, 2-cholorothioxanthone, etc. Likewise, non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof.

Referring back to FIGS. 3B-3C, in addition to the resin 78, the device 70 also includes one or more vents 80. For example, the one or more vents 80 may extend through the resin 78 to an outer surface 88 of the resin 78. In this regard, the outer surface is generally a surface not in contact with the package 50 (e.g., sidewalls 52, base 56) or the ultracapacitor 72. Without intending to be limited by theory, the vents 80 may allow for the escape of any gases that may be formed around the ultracapacitor 72 or leak through from within the housing of the ultracapacitor 72.

The vents may be formed using various means. For example, in one embodiment, a mold may be provided within the interior cavity such that when the aforementioned resin is presented within the interior cavity, it does not occupy the space required by the one or more vents. In this regard, upon formation of the resin, the one or more vents may also be simultaneously formed. Alternatively, once the resin is formed within the interior cavity, drilling (or other similar techniques) may be utilized to create the one or more vents. Regardless of the manner in which the one or more vents are formed, in one embodiment, the one or more vents may remain open and unfilled. In another embodiment, the one or more vents may be filled. The vents may be filled with a ceramic, a resin, etc. In general, the material used to fill the vent may be one that allows for the escape of gases. In this regard, in one embodiment, the resin may be a thermoplastic resin as mentioned above. Alternatively, in another embodiment, the resin may be a thermoset resin as mentioned above. In addition, when filled, the material for filling the vents may be pre-manufactured. That is, they may be manufactured and formed outside of the package and then simply inserted into the opening. Alternatively, the material may be filled into the vents. For example, a polymer melt or precursor solution may be inserted into the vent and thereafter hardened or cured.

Furthermore, as illustrated in FIGS. 3B-3C, the vents extend beyond the surface 88 of the resin 78. In this regard, 50% or less, such as 40% or less, such as 30% or less, such as 20% or less, such as 10% or less, such as 5% or less of the length of the vent may extend outward from the surface 88 of the resin 78. However, it should be understood that, in another embodiment, the vents 80 may not extend beyond the surface 88 and may merely end at the surface 88. Regardless, the vents 80 may not extend beyond the upper end 54 of the sidewalls 52. In addition, as illustrated in FIGS. 3B-3C, the one or more vents 80 may not extend all the way to the surface of the housing of the ultracapacitor 72. In this regard, the one or more vents may extend 40% or more, such as 50% or more, such as 60% or more, such as 70% or more, such as 80% or more, such as 90% or more, such as 95% or more the distance between the surface 88 of the resin 78 and the housing of the ultracapacitor 72. The one or more vents 80 may extend 100% or less, such as 99% or less, such as 98% or less, such as 95% or less, such as 90% or less, such as 80% or less the distance between the surface 88 of the resin 78 and the housing of the ultracapacitor 72. Accordingly, in one embodiment, the one or more vents 80 may extend to the surface of the housing of the ultracapacitor 72.

The vents 80 may also have a particular cross-sectional dimension and/or size. It should be understood that the cross-sectional shape is not necessarily limited. For instance, the cross-sectional shape may be in the form of a circle, an ellipse, a square, a rectangle, a rhombus, a triangle, a star, a cross, etc. In addition, the cross-section of the vents may have a maximum dimension in at least one direction. Such maximum dimension may be 0.1 mm or more, such as 0.5 mm or more, such as 1 mm or more, such as 2 mm or more, such as 3 mm or more, such as 4 mm or more, such as 5 mm or more. Such maximum dimension within the cross-section may be 20 mm or less, such as 10 mm or less, such as 8 mm or less, such as 6 mm or less, such as 5 mm or less, such as 4 mm or less, such as 3 mm or less, such as 2 mm or less, such as 1 mm or less, such as 0.5 mm or less. Further, the cross-sectional area of a vent may be 0.001 $mm^2$ or more, such as 0.01 $mm^2$ or more, such as 0.05 $mm^2$ or more, such as 0.1 $mm^2$ or more, such as 0.2 $mm^2$ or more, such as 0.3 $mm^2$ or more, such as 0.5 $mm^2$ or more, such as 1 $mm^2$ or more, such as 2 $mm^2$ or more, such as 3 $mm^2$ or more, such as 5 mm$^2$ or more, such as 10 mm$^2$ or more, such as 20 mm$^2$ or more. The cross-sectional area of a vent may be 500 mm$^2$ or less, such as 300 mm$^2$ or less, such as 200 mm$^2$ or less, such as 150 mm$^2$ or less, such as 100 mm$^2$ or less, such as 80 mm$^2$ or less, such as 60 mm$^2$ or less, such as 50 mm$^2$ or less, such as 40 mm$^2$ or less, such as 30 mm$^2$ or less, such as 20 mm$^2$ or less, such as 10 mm$^2$ or less, such as 8 mm$^2$ or less, such as 6 mm$^2$ or less, such as 5 mm$^2$ or less, such as 4 mm$^2$ or less, such as 3 mm$^2$ or less, such as 2 mm$^2$ or less, such as 1 mm$^2$ or less, such as 0.5 mm$^2$ or less. In one embodiment, the aforementioned cross-sectional area may apply to the total cross-sectional area of all of the vents combined.

In addition, FIGS. 3B-3C illustrate the vents 80 extending in a direction generally parallel to the sidewalls 52 and generally perpendicular to base 56 of the package 50. For example, the vents 80 extend to the outer surface 88 as illustrated with the outer surface 88 at the interface of the resin 78 and the remaining unoccupied space of the inner cavity 58. However, it should be understood that the vents 80 may extend in other directions as well. For example, the one or more vents 80 may extend in a direction generally perpendicular to the sidewalls 52 and generally parallel to base 56. If the vents 80 are presented in such a manner, the resin 78 may be formed such that it does not extend to one or more of the sidewalls. For instance, by providing an unoccupied cavity between the sidewalls 52 and the resin 78, such cavity may allow for the escape of gases through the vents 80 and into the unoccupied cavity of the interior cavity 58.

It should be understood that the invention is not limited by the number of vents. For instance, FIGS. 3B-3C illustrate three vents. However, the device 70 may simply include one or more vents. For example, the device 70 may simply include one vent in one embodiment. In other embodiments, the device 70 may include more than one vent, such as two or more, such as three or more, such as five or more vents.

Once the ultracapacitor 72 and resin 78 have been provided and the one or more vents 80 have been formed, the package 50 may then be sealed using lid 82. For example, a lid 82 may be disposed on an upper end 54 of the sidewalls 52. The lid 82 may be formed from a ceramic, a metal (e.g., iron, copper, nickel, cobalt, etc., as well as alloys thereof), a plastic, and so forth. In one embodiment, the lid may be formed from a flexible material. For instance, below a certain pressure threshold, the lid may deform when subjected to pressure but may not burst thereby maintaining the structural integrity of the lid and package.

Once the lid is applied, a certain volume of space within the device may be unoccupied. Such volume may be 50 vol. % or less, such as 40 vol. % or less, such as 30 vol. % or less, such as 20 vol. % or less, such as 15 vol. % or less, such as 10 vol. % or less, such as 8 vol. % or less, such as 5 vol. % or less of the volume of the entire interior cavity of the package. Such volume may be 0 vol. % or more, such as 1 vol. % or more, such as 2 vol. % or more, such as 5 vol. % or more, such as 10 vol. % or more, such as 15 vol. % or more, such as 20 vol. % or more, such as 25 vol. % or more, such as 30 vol. % or more of the volume of the entire interior cavity of the package.

Package

Figure 1A:
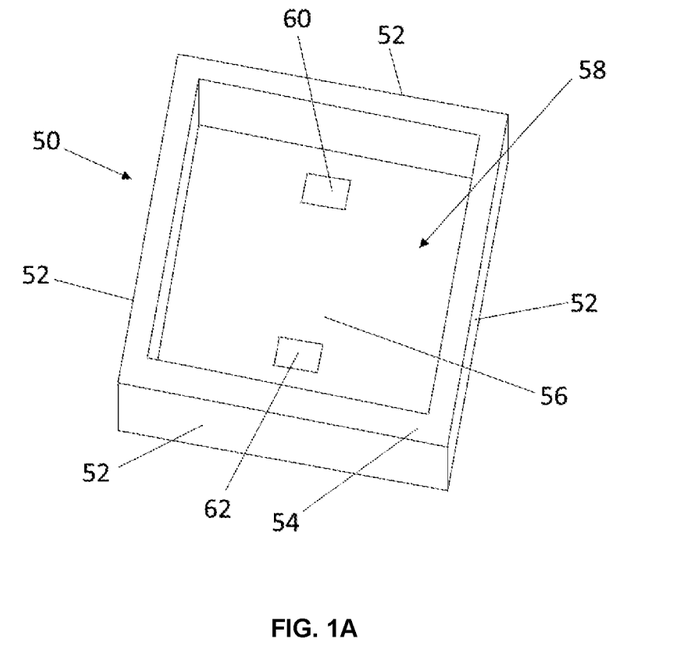
FIGS. 1A-1C illustrate one embodiment of a package according to the present invention.
Figure 1B:
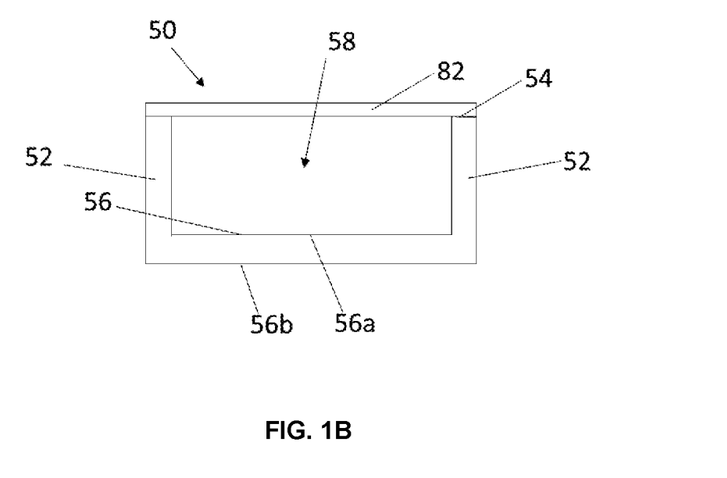
Figure 1C:
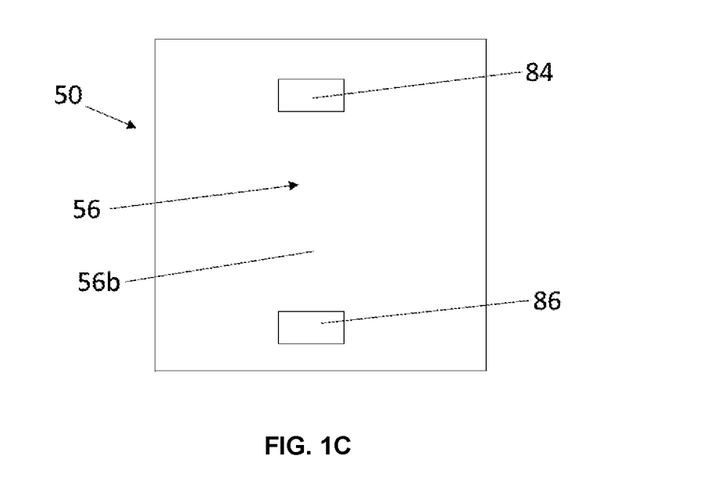

As indicated herein, the surface mountable ultracapacitor device of the present invention employs a package within which the ultracapacitor is housed. In one embodiment, the package may be a surface mountable package. Referring to FIGS. 1A-1C, the package 50 has sidewalls 52 that extend in a direction generally perpendicular to a base 56. The base 56 defines an inner surface 56a and an outer surface 56b. An interior cavity 58 is defined between an inner surface 56a of the base 56 and the sidewalls 52 within which the ultracapacitor can be positioned. In some embodiments, the surface mountable device and interior cavity 58 may be exposed to the environment. In other embodiments, the package 50 may also contain a lid 82 that is disposed on an upper end 54 of the sidewalls 52 to seal the ultracapacitor within the package 50.

If desired, a sealing member (not shown) may be disposed between the lid 82 and the sidewalls 52 to help provide a good seal. In one embodiment, for example, the sealing member may include a glass-to-metal seal, Kovar® ring (Goodfellow Cambridge, Ltd.), etc. The height of the sidewalls 52 is generally such that the lid 82 does not contact any surface of the ultracapacitor 70. In a further embodiment, the height of the sidewalls 52 is generally such that the lid also does not contact any surface of the resin as described herein. When placed in the desired position, the lid 82 may be sealed to the sidewalls 52 using known techniques, such as welding (e.g., resistance welding, laser welding, etc.), soldering, etc.

Any of a variety of different materials may be used to form the package, in particular the sidewalls 52 and the base 56. For instance, these materials may include a metal, a plastic, a ceramic, etc. In one embodiment, for example, the sidewalls and/or base may include one or more layers of a ceramic material. The ceramic material may include aluminum nitride, aluminum oxide, silicon oxide, magnesium oxide, calcium oxide, glass, etc., as well as combinations thereof. In other embodiments, the sidewalls and/or base may include one or more layers of a metal. The metal may include tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth.

In order to attach the ultracapacitor to the package, in particular the electrode assembly to the package in a mechanically stable manner, a first conductive member 60 and a second conductive member 62 are disposed within the interior cavity 58 of the package 50. In particular, the first conductive member 60 and the second conductive member 62 are disposed on the inner surface 56a of the base 56 and extend in a plane that is generally parallel to the base 56. The ultracapacitor likewise contains first and second leads that extend outwardly therefrom and are electrically connected to the first and second conductive members 60 and 62, respectively. The first and second conductive members 60 and 62 are, in turn, electrically connected to first and second external terminations 84 and 86, respectively, which are provided on an outer surface 56b of the base 56 as illustrated in FIG. 1C.

The conductive members may be provided in any form (e.g., pad, plate, frame, etc.) but generally have a relatively small thickness. For instance, the thickness of the conductive members may range from about 0.05 mm or more, such as about 0.1 mm or more, such as about 0.2 mm or more such as about 0.5 mm or more to about 1 mm or less, such as about 0.5 mm or less, such as about 0.4 mm or less, such as about 0.2 mm or less, such as about 0.1 mm or less. The conductive members are typically formed from one or more layers of a metal, such as nickel, silver, gold, tin, copper, etc.

Figure 2:
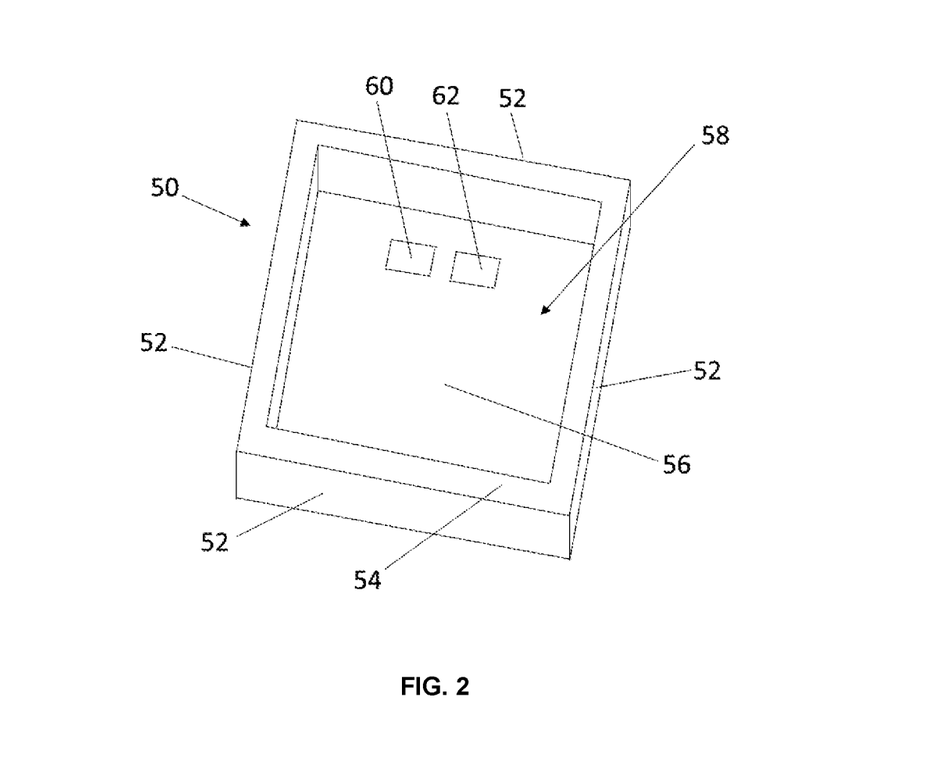
FIG. 2 illustrates another embodiment of a package according to the present invention.

As illustrated in FIG. 1A, the conductive members 60 and 62 are positioned on opposing ends of the inner surface 56a of the base 56. In this regard, such configuration may be beneficial for accommodating an ultracapacitor having terminals or leads on opposing ends. However, as illustrated in FIG. 2, it should be understood that the conductive members 60 and 62 may be positioned on the same end of the inner surface 56a of the base 56. For instance, such a configuration may be beneficial for accommodating an ultracapacitor having terminals or leads on the same end.

Regardless of the configuration, the first and second conductive members 60 and 62 are electrically connected to first and second external terminations 84 and 86, respectively, which are provided on the outer surface 56b of the base 56 and extend in a plane that is generally parallel to the base 56. The terminations 84 and 86 may be provided in any form (e.g., pad, plate, frame, etc.) but generally have a relatively small thickness in order to improve its ability to be surface mounted to a circuit board. For instance, the thickness of the terminations may range from about 0.05 mm or more, such as about 0.1 mm or more, such as about 0.2 mm or more such as about 0.5 mm or more to about 1 mm or less, such as about 0.5 mm or less, such as about 0.4 mm or less, such as about 0.2 mm or less, such as about 0.1 mm or less.

The terminations are typically formed from one or more layers of a metal, such as nickel, silver, gold, tin, copper, etc. If desired, the surface of the terminations may be electroplated with nickel, silver, gold, tin, etc. as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

Regardless of the manner in which they are formed, the first and second external terminations 84 and 86 are electrically connected to the first and second conductive members 60 and 62, respectively, to provide the desired connection with the electrode assembly. In one embodiment, for instance, the conductive members 60 and 62 may simply extend through the base 56 to form the external terminations 84 and 86. Alternatively, a separate conductive trace (not shown) may be attached to the first conductive member 60 that extends through the base 56 and either forms the first external termination 84 or is connected to an additional conductive member that serves as the external termination 84. Similarly, the second conductive member 62 may extend through the base 56 to form the external termination 86, or a separate conductive trace (not shown) may be attached to the second conductive member 62 that extends through the base 56 and either forms the termination 86 or is connected to an additional conductive member that serves as the termination 86. When traces are employed, a via (not shown) may be formed within the base 56 to accommodate the trace.

The manner in which the conductive members and external terminations are electrically connected may vary as is known in the art. In certain embodiments, for example, welding techniques may be employed, such as ultrasonic welding, laser welding, resistance welding, etc. In yet other embodiments, a conductive adhesive may be employed to connect the conductive members to respective terminations.

When employed, the conductive adhesive typically contains a plurality of particles that are formed from an electrically conductive material (e.g., metal). Examples of suitable conductive materials include, for instance, metals, such as nickel, copper, gold, silver, silver coated copper, silver coated nickel, etc., carbon materials, such as graphite, nickel coated carbon, etc.; and so forth. The conductive adhesive also generally contains a resinous material within which the conductive particles are dispersed. Although any resinous material may be employed, it is generally desired to use a resin that is a curable thermosetting resin, such as an epoxy resin, melamine resin, maleimide resin, polyimide resin, phenolic resin, etc. Epoxy resins are particularly suitable. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. Still other suitable conductive adhesive resins may also be described in U.S. Patent Application Publication No. 2006/0038304 to Osako, et al. and U.S. Pat. No. 7,554,793 to Chacko. Typically, the resinous material constitutes from about 0.5 wt. % to about 50 wt. %, in some embodiments from about 1 wt. % to about 25 wt. %, and in some embodiments, from about 2 wt. % to about 20 wt. % of the dry weight of the adhesive. Likewise, the conductive particles typically constitute from about 50 wt. % to about 99.5 wt. %, in some embodiments from about 75 wt. % to about 99 wt. %, and in some embodiments, from about 80 wt. % to about 98 wt. % of the adhesive, on a dry basis. The adhesive may be applied using known techniques, such as screen-printing, dipping, electrophoretic coating, electron beam deposition, spraying, roller pressing, brushing, doctor blade casting, vacuum deposition, coating, etc. Regardless, once applied, the conductive adhesive may be cured as using any of a variety of known techniques, such as heat curing, actinic radiation curing (e.g., ultraviolet radiation, e-beam radiation, infrared radiation, etc.), and so forth.

Electrode Assembly

In general, the ultracapacitor contains an electrode assembly including a first electrode, a second electrode, and a separator. For instance, the first electrode typically includes a first electrode containing a first carbonaceous coating (e.g., activated carbon particles) electrically coupled to a first current collector, and a second electrode typically includes a second carbonaceous coating (e.g., activated carbon particles) electrically coupled to a second current collector. A separator may also be positioned between the first electrode and the second electrode. In addition, the ultracapacitor contains first and second leads that are electrically connected to first and second electrodes, respectively.

Various embodiments of such an assembly are described in more detail below.

Electrodes

As indicated above, the ultracapacitor includes an electrode assembly including a first electrode and a second electrode. The electrodes employed within the assembly generally contain a current collector. The current collectors may be formed from the same or different materials. For instance, in one embodiment, the current collectors of each electrode are formed from the same material. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention.

The current collector substrate may be in the form of a foil, sheet, plate, mesh, etc. The substrate may also have a relatively small thickness, such as about 200 micrometers or less, such as about 150 micrometers or less, such as about 100 micrometers or less, such as about 80 micrometers or less, such as about 50 micrometers or less, such as about 40 micrometers or less, such as about 30 micrometers or less.

The substrate may have a thickness of about 1 micrometer or more, such as about 5 micrometers or more, such as about 10 micrometers or more, such as about 20 micrometers or more.

Figure 7:
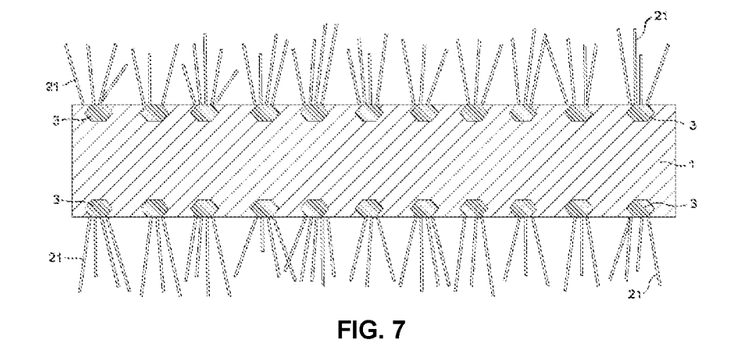
FIG. 7 illustrates one embodiment of a current collector that may be employed in the ultracapacitor of the present invention.
Figure 8:
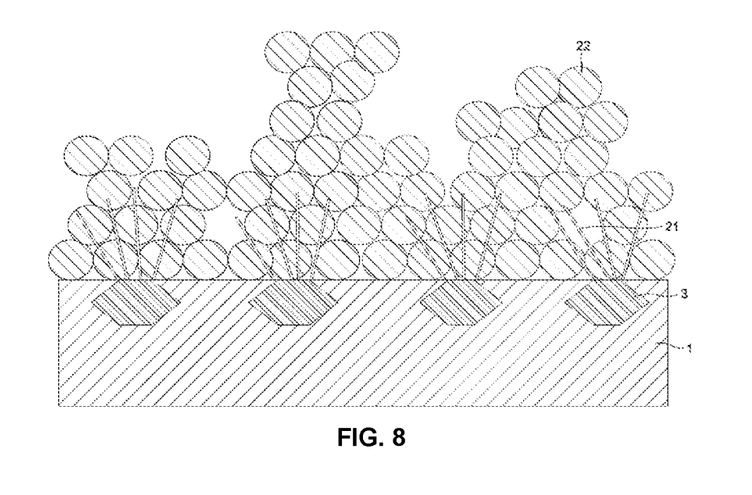
FIG. 8 illustrates one embodiment of a current collector/carbonaceous coating configuration that may be employed in the ultracapacitor of the present invention.

Although by no means required, the surface of the substrate may be treated. For example, in one embodiment, the surface may be roughened, such as by washing, etching, blasting, etc. In certain embodiments, the current collector may contain a plurality of fiber-like whiskers that project outwardly from the substrate. Without intending to be limited by theory, it is believed that these whiskers can effectively increase the surface area of the current collector and also improve the adhesion of the current collector to the corresponding electrode. This can allow for the use of a relatively low binder content in the first electrode and/or second electrode, which can improve charge transfer and reduce interfacial resistance and consequently result in very low ESR values. The whiskers are typically formed from a material that contains carbon and/or a reaction product of carbon and the conductive metal. In one embodiment, for example, the material may contain a carbide of the conductive metal, such as aluminum carbide ($Al_4C_3$). Referring to FIG. 7, for instance, one embodiment of a current collector is shown that contains a plurality of whiskers 21 projecting outwardly from a substrate 1. If desired, the whiskers 21 may optionally project from a seed portion 3 that is embedded within the substrate 1. Similar to the whiskers 21, the seed portion 3 may also be formed from a material that contains carbon and/or a reaction product of carbon and the conductive metal, such as a carbide of the conductive metal (e.g., aluminum carbide). Further, FIG. 8 illustrates an electrode including the aforementioned current collector having a plurality of whiskers 21 projecting outwardly from a substrate 1 in combination with a carbonaceous coating 22 as described herein.

The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

The electrodes used in the ultracapacitor also contain carbonaceous materials that are coated onto opposing sides of the current collectors. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 micrometers or more, such as about 0.1 micrometers or more, such as about 0.5 micrometers or more, such as about 1 micrometer or more to about 30 micrometers or less, such as about 25 micrometers or less, such as about 20 micrometers or less, such as about 15 micrometers or less, such as about 10 micrometers or less. At least 90% by volume of the particles (D90 size) may likewise have a size in the range of from about 2 micrometers or more, such as about 5 micrometers or more, such as about 6 micrometers or more to about 40 micrometers or less, such as about 30 micrometers or less, such as about 20 micrometers or less, such as about 15 micrometers or less. The BET surface may also range from about 900 $m^2/g$ or more, such as about 1,000 $m^2/g$ or more, such as about 1,100 $m^2/g$ or more, such as about 1,200 $m^2/g$ or more to about 3,000 $m^2/g$ or less, such as about 2,500 $m^2/g$ or less, such as about 2,000 $m^2/g$ or less, such as about 1,800 $m^2/g$ or less, such as about 1,500 $m^2/g$ or less.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, such as about 40 vol. % or less, such as about 30 vol. % or less, such as about 20 vol. % or less, such as about 15 vol. % or less, such as about 10 vol. % or less, such as about 5 vol. % or less of the total pore volume. The amount of pores less than about 2 nanometers in size (i.e., "micropores") may provide a pore volume of about 0 vol % or more, such as about 0.1 vol % or more, such as about 0.5 vol % or more, such as 1 vol % or more of the total pore volume. The amount of pores between about 2 nanometers and about 50 nanometers in size (i.e., "mesopores") may likewise be about 20 vol. % or more, such as about 25 vol. % or more, such as about 30 vol. % or more, such as about 35 vol. % or more, such as about 40 vol. % or more, such as about 50 vol. % or more of the total pore volume. The amount of pores between about 2 nanometers and about 50 nanometers in size (i.e., "mesopores") may be about 90 vol. % or less, such as about 80 vol. % or less, such as about 75 vol. % or less, such as about 65 vol. % or less, such as about 55 vol. % or less, such as about 50 vol. % or less of the total pore volume. Finally, the amount of pores greater than about 50 nanometers in size (i.e., "macropores") may be about 1 vol. % or more, such as about 5 vol. % or more, such as about 10 vol. % or more, such as about 15 vol. % or more of the total pore volume. The amount of pores greater than about 50 nanometers in size (i.e., "macropores") may be about 50 vol. % or less, such as about 40 vol. % or less, such as about 35 vol. % or less, such as about 30 vol. % or less, such as about 25 vol. % or less of the total pore volume. The total pore volume of the carbon particles may be in the range of from about 0.2 cm$^3$/g or more, such as about 0.4 cm$^3$/g or more, such as about, 0.5 cm$^3$/g or more to about 1.5 cm$^3$/g or less, such as about 1.3 cm$^3$/g or less, such as about 1.0 cm$^3$/g or less, such as about 0.8 cm$^3$/g or less. The median pore width may be about 8 nanometers or less, such as about 5 nanometers or less, such as about 4 nanometers or less. The median pore width may be about 1 nanometer or more, such as about 2 nanometers or more. The pore sizes and total pore volume may be measured using nitrogen adsorption and analyzed by the Barrett-Joyner-Halenda ("BJH") technique as is well known in the art.

One unique aspect of the present invention is that the electrodes need not contain a substantial amount of binders conventionally employed in ultracapacitor electrodes. That is, binders may be present in an amount of about 60 parts or less, such as about 40 parts or less, such as about 30 parts or less, such as about 25 parts or less, such as about 20 parts or less to about 1 part or more, such as about 5 parts or more per 100 parts of carbon in the carbonaceous coating. Binders may, for example, constitute about 15 wt. % or less, such as about 10 wt. % or less, such as about 8 wt. % or less, such as about 5 wt. % or less, such as about 4 wt. % or less of the total weight of the carbonaceous coating. The binders may constitute about 0.1 wt. % or more, such as about 0.5 wt. % or more, such as about 1 wt. % or more of the total weight of the carbonaceous coating.

Nevertheless, when employed, any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxylalkyl cellulose ethers (e.g., carboxymethyl cellulose); and so forth, as well as protonated salts of any of the foregoing, such as sodium carboxymethyl cellulose.

If desired, other materials may also be employed within an activated carbon layer of the carbonaceous materials. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable in one embodiment. In another embodiment, carbon nanotubes are particularly suitable. When employed, conductivity promoters typically constitute about 60 parts or less, such as about 40 parts or less, such as about 30 parts or less, such as about 25 parts or less, such as about 20 parts or less to about 1 part or more, such as about 5 parts or more per 100 parts of carbon in the carbonaceous coating. Conductivity promoters may, for example, constitute about 15 wt. % or less, such as about 10 wt. % or less, such as about 8 wt. % or less, such as about 5 wt. % or less, such as about 4 wt. % or less of the total weight of the carbonaceous coating. The conductivity promoters may constitute about 0.1 wt. % or more, such as about 0.5 wt. % or more, such as about 1 wt. % or more of the total weight of the carbonaceous coating. Meanwhile, activated carbon particles likewise typically constitute 85 wt. % or more, such as about 90 wt. % or more, such as about 95 wt. % or more, such as about 97 wt. % or more of the total weight of the carbonaceous coating. The activated carbon particles may constitute less than 100 wt. %, such as about 99.5 wt. % or less, such as about 99 wt. % or less, such as about 98 wt. % or less of the total weight of the carbonaceous coating.

The particular manner in which a carbonaceous material is coated onto to the sides of a current collector may vary as is well known to those skilled in the art, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendared) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

Separator

As indicated above, the electrode assembly may include a separator positioned between the first electrode and the second electrode. The separator can enable electrical isolation of one electrode from another to help prevent an electrical short but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc.

Regardless of the particular materials employed, the separator typically has a thickness of about 150 micrometers or less, such as about 100 micrometers or less, such as about 80 micrometers or less, such as about 50 micrometers or less, such as about 40 micrometers or less, such as about 30 micrometers or less. The separator may have a thickness of about 1 micrometer or more, such as about 5 micrometers or more, such as about 10 micrometers or more, such as about 20 micrometers or more.

Nonaqueous Electrolyte

In addition, the ultracapacitor may also include an electrolyte employed within the housing. The electrolyte is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Propylene carbonate is particularly suitable due to its high electric conductivity and decomposition voltage, as well as its ability to be used over a wide range of temperatures. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte also contains at least one ionic liquid, which may be dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, such as about 1.2 M or more, such as about 1.3 M or more, such as about 1.5 M or more. The ionic liquid may be present in an amount of about 2.0 M or less, such as about 1.8 M or less, such as about 1.5 M or less, such as about 1.4 M or less, such as about 1.3 M or less.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

Housing

Figure 9:
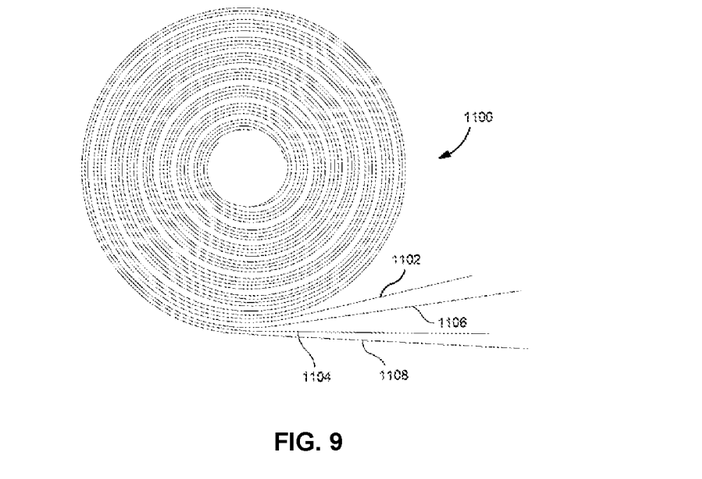
FIG. 9 illustrates one embodiment for forming an electrode assembly that can be used in the ultracapacitor of the present invention.

The ultracapacitor of the present invention employs a housing within which the electrode assembly and electrolyte are retained. The manner in which the components are inserted into the housing may vary as is known in the art. For example, the electrodes and separator may be initially folded, wound, or otherwise contacted together to form an electrode assembly. The electrolyte may optionally be immersed into the electrodes of the assembly. In one particular embodiment, the electrodes, separator, and optional electrolyte may be wound into an electrode assembly having a "jelly-roll" configuration. Referring to FIG. 9, for instance, one embodiment of such a jellyroll electrode assembly 1100 is shown that contains a first electrode 1102, a second electrode 1104, and a separator 1106 positioned between the electrodes 1102 and 1104. In this particular embodiment, the electrode assembly 1100 also includes another separator 1108 that is positioned over the second electrode 1104. In this manner, each of two coated surfaces of the electrodes is separated by a separator, thereby maximizing surface area per unit volume and capacitance. While by no means required, the electrodes 1102 and 1104 are offset in this embodiment so as to leave their respective contact edges extending beyond first and second edges of the first and second separators 1106 and 1108, respectively. Among other things, this can help prevent "shorting" due to the flow of electrical current between the electrodes. However, it should be understood that other configurations may also be utilized. For instance, in another embodiment, the electrodes, separator, and optional electrolyte may be provided as an electrode assembly having a laminar configuration.

Figure 6:
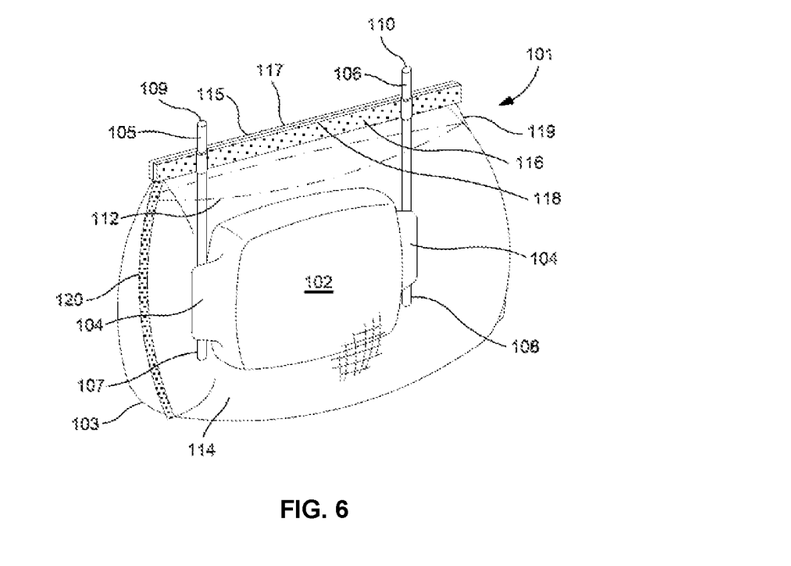

As indicated herein, the components may be provided within the housing of the ultracapacitor and optionally hermetically sealed. The nature of the housing may vary as desired. In certain embodiments, for example, the housing may be in the form of a flexible package that encloses the components of the ultracapacitor. Referring to FIG. 6, for example, one embodiment of an ultracapacitor 101 is shown that contains a flexible package 103 that encloses an electrode assembly 102 and electrolyte 112. The electrode assembly 102 may contain electrodes 105 and 106 and a separator (not shown) stacked in a face to face configuration and connected together by opposing tabs 104. The ultracapacitor 101 also contains a first terminal 105 and a second terminal 106, which are respectively electrically connected with the tabs 104. More particularly, the electrodes 105 and 106 have first ends 107 and 108 disposed within the package 103 and respective second ends 109 and 110 disposed outside of the package 103. It should be understood that apart from stacking, the electrode assembly may be provided in any other form desired. For example, the electrodes may be folded or wounded together in a jelly roll configuration.

The package 103 generally includes a substrate 114 that extends between two ends 115 and 116 and that has edges 117, 118, 119 and 120. The ends 115 and 116, as well as the portions of both sides 119 and 120 that overlap, are fixedly and sealingly abutted against one another (e.g., by heat welding). In this manner, the electrolyte 112 can be retained within the package 103. The substrate 114 typically has a thickness of from about 20 micrometers or more, such as about 50 micrometers or more, such as about 100 micrometers or more, such as about 200 micrometers or more, such as about to about 1,000 micrometers or less, such as about 800 micrometers or less, such as about 600 micrometers or less, such as about 400 micrometers or less, such as about 200 micrometers or less.

The substrate 114 may contain any number of layers desired to achieve the desired level of barrier properties, such as 1 or more, in some embodiments 2 or more, and in some embodiments, from 2 to 4 layers. Typically, the substrate contains a barrier layer, which may include a metal, such as aluminum, nickel, tantalum, titanium, stainless steel, etc. Such a barrier layer is generally impervious to the electrolyte so that it can inhibit leakage thereof, and also generally impervious to water and other contaminants. If desired, the substrate may also contain an outer layer that serves as a protective layer for the package. In this manner, the barrier layer is positioned between the outer layer and the electrode assembly. The outer layer may, for instance, be formed from a polymer film, such as those formed from a polyolefin (e.g., ethylene copolymers, propylene copolymers, propylene homopolymers, etc.), polyesters, etc. Particularly suitable polyester films may include, for example, polyethylene terephthalate, polyethylene naphthalate, polybutylene terephthalate, etc.

If desired, the substrate may also contain an inner layer that is positioned between the electrode assembly and the barrier layer. In certain embodiments, the inner layer may contain a heat-sealable polymer. Suitable heat-sealable polymers may include, for instance, vinyl chloride polymers, vinyl chloridine polymers, ionomers, etc., as well as combinations thereof. Ionomers are particularly suitable. In one embodiment, for instance, the ionomer may be a copolymer that contains an α-olefin and (meth)acrylic acid repeating unit. Specific α-olefins may include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Ethylene is particularly suitable. As noted, the copolymer may also a (meth)acrylic acid repeating unit. As used herein, the term "(meth)acrylic" includes acrylic and methacrylic monomers, as well as salts or esters thereof, such as acrylate and methacrylate monomers. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. Typically, the α-olefin/(meth) acrylic acid copolymer is at least partially neutralized with a metal ion to form the ionomer. Suitable metal ions may include, for instance, alkali metals (e.g., lithium, sodium, potassium, etc.), alkaline earth metals (e.g., calcium, magnesium, etc.), transition metals (e.g., manganese, zinc, etc.), and so forth, as well as combinations thereof. The metal ions may be provided by an ionic compound, such as a metal formate, acetate, nitrate, carbonate, hydrogen carbonate, oxide, hydroxide, alkoxide, and so forth.

Apart from a flexible package, such as described above, other housing configurations may also be employed. For example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present invention. The metal container may have any of a variety of different shapes, such as cylindrical, D-shaped, etc. Cylindrically-shaped containers are particular suitable.

Figure 5:
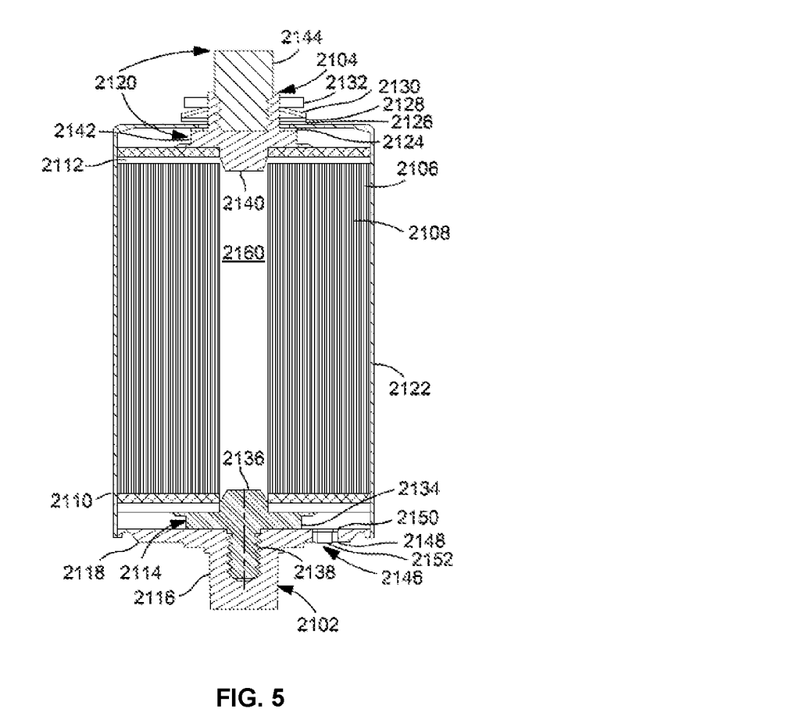
FIGS. 5 and 6 illustrate embodiments of the housing of the ultracapacitor of the present invention.

The electrode assembly may be sealed within the cylindrical housing using a variety of different techniques. Referring to FIG. 5, one embodiment of an ultracapacitor is shown that contains an electrode assembly 2108, which contains layers 2106 wound together in a jellyroll configuration as discussed above. In this particular embodiment, the ultracapacitor contains a first collector disc 2114, which contains a disc-shaped portion 2134, a stud portion 2136, and a fastener 2138 (e.g., screw). The collector disc 2114 is aligned with a first end of a hollow core 2160, which is formed in the center of the electrode assembly, and the stud portion 2136 is then inserted into an opening of the core so that the disc-shaped portion 2134 sits against the first end of the electrode assembly 2108 at a first contact edge 2110. A lid 2118 is welded (e.g., laser welded) to a first terminal post 2116, and a socket, which may be for example, threaded, is coupled to the fastener 2138. The ultracapacitor also contains a second collector disc 2120, which contains a disc-shaped portion 2142, a stud portion 2140, and a second terminal post 2144. The second collector disc 2120 is aligned with the second end of the hollow core 2160, and the stud portion 2140 is then inserted into the opening of the core so that the collector disc portion 2142 sits against the second end of the electrode assembly 2108.

A metal container 2122 (e.g., cylindrically-shaped can) is thereafter slid over the electrode assembly 2108 so that the second collector disc 2120 enters the container 2122 first, passes through a first insulating washer 2124, passes through an axial hole at an end of the container 2122, and then passes through a second insulating washer 2126. The second collector disc 2120 also passes through a flat washer 2128 and a spring washer 2130. A locknut 2132 is tightened over the spring washer 2130, which compresses the spring washer 2130 against the flat washer 2128, which in turn is compressed against the second insulating washer 2126. The second insulating washer 2126 is compressed against the exterior periphery of the axial hole in the metal container 2122, and as the second collector disc 2120 is drawn by this compressive force toward the axial hole, the first insulating washer 2124 is compressed between the second collector disc 2120 and an interior periphery of the axial hole in the container 2122. A flange on the first insulating washer 2124 inhibits electrical contact between the second collector disc 2120 and a rim of the axial hole. Simultaneously, the lid 2118 is drawn into an opening of the container 2122 so that a rim of the lid 2118 sits just inside a lip of the opening of the container 2122. The rim of the lid 2118 is then welded to the lip of the opening of the container 2122.

Once the locknut 2132 is tightened against the spring washer 2130, a hermetic seal may be formed between the axial hole, the first insulating washer 2124, the second insulating washer 2126, and the second collector disc 2120. Similarly, the welding of the lid 2118 to the lip of the container 2122, and the welding of the lid 2118 to the first terminal post 2116, may form another hermetic seal. A hole 2146 in the lid 2118 can remain open to serve as a fill port for the electrolyte described above. Once the electrolyte is in the can (i.e., drawn into the can under vacuum, as described above), a bushing 2148 is inserted into the hole 2146 and seated against a flange 2150 at an interior edge of the hole 2146. The bushing 2148 may, for instance, be a hollow cylinder in shape, fashioned to receive a plug 2152. The plug 2152, which is cylindrical in shape, is pressed into a center of the bushing 2148, thereby compressing the bushing 2148 against an interior of the hole 2146 and forming a hermetic seal between the hole 2146, the bushing 2148, and the plug 2152. The plug 2152 and the bushing 2148 may be selected to dislodge when a prescribed level of pressure is reached within the ultracapacitor, thereby forming an overpressure safety mechanism.

The embodiments described above generally refer to the use of a single electrode assembly in the ultracapacitor. It should of course be understood, however, that the capacitor of the present invention may also contain two or more electrode assemblies. For instance, in one such embodiment, for example, the ultracapacitor may include a stack of two or more electrode assemblies, which may be the same or different.

Properties and Applications

The ultracapacitor utilized according to the present invention may exhibit excellent electrical properties, in particular when exposed to high temperatures. For example, the ultracapacitor may exhibit a capacitance of about 6 Farads per cubic centimeter ("F/cm$^3$") or more, in some embodiments about 8 F/cm$^3$ or more, in some embodiments from about 9 to about 100 F/cm$^3$, and in some embodiments, from about 10 to about 80 F/cm$^3$, measured at a temperature of 23° C., frequency of 120 Hz, and without an applied voltage. The ultracapacitor may also have a low equivalence series resistance ("ESR"), such as about 150 mohms or less, in some embodiments less than about 125 mohms, in some embodiments from about 0.01 to about 100 mohms, and in some embodiments, from about 0.05 to about 70 mohms, determined at a temperature of 23° C., frequency of 1 kHz, and without an applied voltage. As indicated above, the resulting ultracapacitor may exhibit a wide variety of beneficial electrical properties, such as improved capacitance and ESR values. Notably, the ultracapacitor may exhibit excellent electrical properties even when exposed to high temperatures. For example, the ultracapacitor may be placed into contact with an atmosphere having a temperature of from about 80° C. or more, in some embodiments from about 100° C. to about 150° C., and in some embodiments, from about 105° C. to about 130° C. (e.g., 85° C. or 105° C.). The capacitance and ESR values can remain stable at such temperatures for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours).

In one embodiment, for example, the ratio of the capacitance value of the ultracapacitor after being exposed to the hot atmosphere (e.g., 85° C. or 105° C.) for 1008 hours to the capacitance value of the ultracapacitor when initially exposed to the hot atmosphere is about 0.75 or more, in some embodiments from about 0.8 to 1.0, and in some embodiments, from about 0.85 to 1.0. Such high capacitance values can also be maintained under various extreme conditions, such as when applied with a voltage and/or in a humid atmosphere. For example, the ratio of the capacitance value of the ultracapacitor after being exposed to the hot atmosphere (e.g., 85° C. or 105° C.) and an applied voltage to the initial capacitance value of the ultracapacitor when exposed to the hot atmosphere but prior to being applied with the voltage may be about 0.60 or more, in some embodiments from about 0.65 to 1.0, and in some embodiments, from about 0.7 to 1.0. The voltage may, for instance, be about 1 volt or more, in some embodiments about 1.5 volts or more, and in some embodiments, from about 2 to about 10 volts (e.g., 2.1 volts). In one embodiment, for example, the ratio noted above may be maintained for 1008 hours or more. The ultracapacitor may also maintain the capacitance values noted above when exposed to high humidity levels, such as when placed into contact with an atmosphere having a relative humidity of about 40% or more, in some embodiments about 45% or more, in some embodiments about 50% or more, and in some embodiments, about 70% or more (e.g., about 85% to 100%). Relative humidity may, for instance, be determined in accordance with ASTM E337-02, Method A (2007). For example, the ratio of the capacitance value of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 0.7 or more, in some embodiments from about 0.75 to 1.0, and in some embodiments, from about 0.80 to 1.0. In one embodiment, for example, this ratio may be maintained for 1008 hours or more.

The ESR can also remain stable at such temperatures for a substantial period of time, such as noted above. In one embodiment, for example, the ratio of the ESR of the ultracapacitor after being exposed to the hot atmosphere (e.g., 85° C. or 105° C.) for 1008 hours to the ESR of the ultracapacitor when initially exposed to the hot atmosphere is about 1.5 or less, in some embodiments about 1.2 or less, and in some embodiments, from about 0.2 to about 1. Notably, such low ESR values can also be maintained under various extreme conditions, such as when applied with a high voltage and/or in a humid atmosphere as described above. For example, the ratio of the ESR of the ultracapacitor after being exposed to the hot atmosphere (e.g., 85° C. or 105° C.) and an applied voltage to the initial ESR of the ultracapacitor when exposed to the hot atmosphere but prior to being applied with the voltage may be about 1.8 or less, in some embodiments about 1.7 or less, and in some embodiments, from about 0.2 to about 1.6. In one embodiment, for example, the ratio noted above may be maintained for 1008 hours or more. The ultracapacitor may also maintain the ESR values noted above when exposed to high humidity levels. For example, the ratio of the ESR of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 1.5 or less, in some embodiments about 1.4 or less, and in some embodiments, from about 0.2 to about 1.2. In one embodiment, for example, this ratio may be maintained for 1008 hours or more.

Furthermore, the surface mountable ultracapacitor device as disclosed herein may be mounted onto a circuit board, such as a printed circuit board. In general, the circuit board contains a substrate (e.g., insulating layer) having an upper surface and a lower surface as well as a plurality of electrical current paths defined therein. The external terminations of the device are in respective electrical communication with the predetermined current paths of the circuit board. In addition, the external terminations of the device can be physically connected to the circuit board using any method generally known in the art, such as general soldering techniques.

The device and circuit board as disclosed herein may be employed in many applications. As one example, these applications can include various communications devices. For instance, they can include Ethernet systems, wireless network routers, fiber optic communications systems, storage devices, mobile devices, computer memory devices (e.g., RAM), etc.

Test Methods

Equivalent Series Resistance (ESR): Equivalence series resistance may be measured using a Keithley 3330 Precision LCZ meter with a DC bias of 0.0 volts, 1.1 volts, or 2.1 volts (0.5 volt peak to peak sinusoidal signal). The operating frequency is 1 kHz. A variety of temperature and relative humidity levels may be tested. For example, the temperature may be 23° C., 85° C. or 105° C., and the relative humidity may be 25% or 85%.

Capacitance: The capacitance may be measured using a Keithley 3330 Precision LCZ meter with a DC bias of 0.0 volts, 1.1 volts, or 2.1 volts (0.5 volt peak to peak sinusoidal signal). The operating frequency is 120 Hz. A variety of temperature and relative humidity levels may be tested. For example, the temperature may be 23° C., 85° C. or 105° C., and the relative humidity may be 25% or 85%.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A surface mountable ultracapacitor device, the device comprising:
    a package including sidewalls extending in a direction generally perpendicular to a base to define an upper end wherein an interior cavity is defined between an inner surface of the base and the sidewalls;
    first and second conductive members disposed on the inner surface of the base;
    first and second external terminations on the outer surface of the base and electrically connected to the first and second conductive members, respectively;
    an ultracapacitor positioned within the interior cavity and including a housing and an electrode assembly and electrolyte within the housing, the ultracapacitor including first and second leads electrically connected to the first and second conductive members, respectively;
    a resin provided within the interior cavity and encapsulating at least a portion of the ultracapacitor; and
    one or more vents extending through the resin, wherein 30% or less of the length of the one or more vents extends from a surface of the resin.

2. The device of claim 1, wherein the sidewalls and the base contain a ceramic material.

3. The device of claim 1, wherein the sidewalls and the base contain a metal.

4. The device of claim 1, wherein the first and second conductive members extend in a plane that is generally parallel to the base.

5. The device of claim 1, wherein the first and second terminations extend in a plane that is generally parallel to the base.

6. The device of claim 1, wherein the conductive members and terminations contain a metal.

7. The device of claim 1, wherein the conductive members extend through the base to form the terminations.

8. The device of claim 1, wherein a conductive trace is attached to the first conductive member and extends through the base and is attached to the first external termination, and further wherein a conductive trace is attached to the second conductive member and extends through the base and is attached to the second external termination.

9. The device of claim 1, wherein the leads extend from the same end of the housing of the ultracapacitor.

10. The device of claim 1, wherein the leads extend from opposing ends of the housing of the ultracapacitor.

11. The device of claim 1, wherein the resin is a thermoset.

12. The device of claim 11, wherein the resin is an epoxy resin.

13. The device of claim 1, wherein the resin is a thermoplastic.

14. The device of claim 1, wherein the resin occupies at least 50 vol. % of the interior cavity of the package, the interior cavity defined as after positioning the ultracapacitor.

15. The device of claim 1, wherein the resin covers 90% or more of the exposed area of the ultracapacitor after positioning the ultracapacitor.

16. The device of claim 1, wherein the one or more vents contain a thermoset.

17. The device of claim 1, wherein the one or more vents contain a thermoplastic.

18. The device of claim 1, wherein the one or more vents extend 70% or more of the distance between a surface of the resin and the housing of the ultracapacitor.

19. The device of claim 1, wherein 20% or less of the length of the vent extends from a surface of the resin.

20. A printed circuit board including the surface mountable ultracapacitor device of claim 1.

21. A communications device including the surface mountable ultracapacitor device of claim 1.

22. A surface mountable ultracapacitor device, the device comprising:
- a package including sidewalls extending in a direction generally perpendicular to a base to define an upper end wherein an interior cavity is defined between an inner surface of the base and the sidewalls;
- first and second conductive members disposed on the inner surface of the base;
- first and second external terminations on the outer surface of the base and electrically connected to the first and second conductive members, respectively;
- an ultracapacitor positioned within the interior cavity and including a housing and an electrode assembly and electrolyte within the housing, the ultracapacitor including first and second leads electrically connected to the first and second conductive members, respectively;
- a resin provided within the interior cavity and encapsulating at least a portion of the ultracapacitor; and
- one or more vents extending through the resin and at least to a surface of the resin, wherein the one or more vents contain a thermoset.

23. A surface mountable ultracapacitor device, the device comprising:
- a package including sidewalls extending in a direction generally perpendicular to a base to define an upper end wherein an interior cavity is defined between an inner surface of the base and the sidewalls;
- first and second conductive members disposed on the inner surface of the base;
- first and second external terminations on the outer surface of the base and electrically connected to the first and second conductive members, respectively;
- an ultracapacitor positioned within the interior cavity and including a housing and an electrode assembly and electrolyte within the housing, the ultracapacitor including first and second leads electrically connected to the first and second conductive members, respectively;
- a resin provided within the interior cavity and encapsulating at least a portion of the ultracapacitor; and
- one or more vents extending through the resin and at least to a surface of the resin, wherein the one or more vents contain a thermoplastic.

* * * * *